United States Patent
Claesson et al.

(10) Patent No.: US 8,188,408 B2
(45) Date of Patent: May 29, 2012

(54) CONVEYORIZED OVEN AND METHOD FOR UNIFORM COOKING

(75) Inventors: Jan Claesson, Land O'Lakes, FL (US);
Raymond Carr, Lutz, FL (US);
Roberto Nevarez, Hudson, FL (US)

(73) Assignee: Enodis Corporation, New Port Richey, FL (US)

( * ) Notice: Subject to any disclaimer, the term of this patent is extended or adjusted under 35 U.S.C. 154(b) by 929 days.

(21) Appl. No.: 12/075,917

(22) Filed: Mar. 14, 2008

(65) Prior Publication Data
US 2008/0230533 A1     Sep. 25, 2008

Related U.S. Application Data

(60) Provisional application No. 60/895,308, filed on Mar. 16, 2007.

(51) Int. Cl.
*F27B 9/06*     (2006.01)
*A47J 27/00*    (2006.01)

(52) U.S. Cl. .......... 219/388; 219/387; 219/391; 99/325; 99/407; 700/211; 700/112; 700/247

(58) Field of Classification Search .................. 219/387, 219/388, 391; 99/325, 407; 700/211, 112, 700/247
See application file for complete search history.

(56) References Cited

U.S. PATENT DOCUMENTS

| | | | | |
|---|---|---|---|---|
| 3,627,535 A | * | 12/1971 | Davidson et al. | 426/441 |
| 5,172,328 A | * | 12/1992 | Cahlander et al. | 700/211 |
| 5,261,527 A | | 11/1993 | Krismanth et al. | 198/833 |
| 5,821,503 A | | 10/1998 | Witt | 219/388 |
| 5,915,681 A | * | 6/1999 | Milne | 271/12 |
| 6,624,396 B2 | | 9/2003 | Witt et al. | 219/497 |
| 7,655,884 B2 | * | 2/2010 | Engelhardt | 219/388 |
| 2003/0032191 A1 | | 2/2003 | Hilson et al. | |
| 2003/0209542 A1 | | 11/2003 | Harris et al. | |
| 2005/0095087 A1 | | 5/2005 | Sullivan et al. | |

OTHER PUBLICATIONS

Written Opinion and International Search Report from corresponding PCT/US2008/003360 dated Aug. 8, 2008.

* cited by examiner

*Primary Examiner* — Shawntina Fuqua
(74) *Attorney, Agent, or Firm* — Ohlandt, Greeley, Ruggiero & Perle, L.L.P.

(57) ABSTRACT

A conveyorized oven that provides uniform cooking with control of the heater and/or the conveyor belt speed. The oven includes a controller that monitors power consumption of the heater and uses the power consumption to control the heater and/or the speed of the motor that drives the conveyor belt. The power consumption is monitored by counting the on time cycles of a switch that connects and disconnects the heater to a power main. Changes in the power consumption due to changes in loading are used by the controller to reduce recovery times of the oven temperature to a set temperature by controlling the heater and/or the motor. By using a stepper motor, there is no need for a gear box.

27 Claims, 3 Drawing Sheets

CONVEYORIZED OVEN AND METHOD FOR UNIFORM COOKING

RELATED APPLICATION

This application claims priority of U.S. Provisional Application Ser. No. 60/895,308, filed on Mar. 16, 2007, the entire contents of which are incorporated herein by reference.

FIELD OF THE INVENTION

This disclosure relates to a conveyorized oven with radiant heating and a controller for uniform cooking of food products.

BACKGROUND OF THE INVENTION

Most ovens with a radiant heat source have a load dependency that yields different cooking results depending on how many food items are cooked simultaneously and the frequency of loading the food items. A typical example is a conveyer toaster for commercial food service where the browning of the toast will vary due to the load factor (continuous use or single piece processing) as well as the age or use of the toaster itself. Manufacturers have attempted to deal with some of these issues, but the major disadvantages are that the toasters do not react quickly and accurately and do not deal with the variation in radiation that typically occurs over the lifetime of the appliance. The most common approach takes information from an oven temperature sensor and adjusts the conveyor speed as described, e.g., in U.S. Pat. No. 5,821,503 and U.S. Pat. No. 6,624,396. This approach has the disadvantage of having a long processing time when the load factor increases.

One of the weakest parts of appliances having a conveyor is the gearbox that is normally required on the motor driving the conveyor. Due to the low rotational speeds required by the conveyor, it is difficult to find a motor with sufficient torque without a gearbox. If the motor has a gearbox, it is normally expensive due to the requirements of durability and side-loading of the drive shaft.

Thus, there is a need for consistent cooking of food items that is independent of load factors and age of the toasting appliance.

There is a need for minimization of cooking variations due to main voltage fluctuations.

There is a need for consistent cooking of food items for the same cooking set point.

There is a need for minimization of the variation in processing time for different load factors.

There is a need for a conveyor drive without a gear box.

There is need for an improved temperature control.

SUMMARY OF THE INVENTION

A first embodiment of a conveyor oven of the present disclosure comprises a conveyor belt that is driven by a drive wheel. A stepper motor comprises an output shaft that is coupled to the drive wheel. A controller is coupled to drive the stepper motor.

In one aspect of the first embodiment of the conveyor oven of the present disclosure, the stepper motor further comprises first and second windings. The controller provides first and second sinusoidal currents to the first and second windings, respectively.

In another aspect of the first embodiment of the conveyor oven of the present disclosure, the first sinusoidal current is 90 degrees out of phase with the second sinusoidal current.

In another aspect of the first embodiment of the conveyor oven of the present disclosure, the controller controls a speed of the stepper motor based on a load variance of food products disposed on the conveyor belt.

In another aspect of the first embodiment of the conveyor oven of the present disclosure, the conveyor belt is disposed in an oven compartment. A heater is disposed in the oven compartment to provide heat to cook food products disposed on the conveyor belt. The controller determines the load variance by monitoring a power consumption of the heater and controls the stepper motor speed based on the power consumption, thereby controlling the conveyor belt speed.

In another aspect of the first embodiment of the conveyor oven of the present disclosure, the heater is an electric heater connected in circuit with a power main by a switch. The controller determines the power consumption based on an amount of time the heater is connected with the power main by the switch.

In another aspect of the first embodiment of the conveyor oven of the present disclosure, the controller further controls the stepper motor speed based on a member of the group consisting of: a predetermined cook speed, the stepper motor speed and a combination thereof.

In another aspect of the first embodiment of the conveyor oven of the present disclosure, the stepper motor further comprises first and second windings. The controller provides first and second sinusoidal currents to the first and second windings, respectively. The first and second sinusoidal currents have a frequency that is a function of the power consumption and the member of the group.

In another aspect of the first embodiment of the conveyor oven of the present disclosure, the stepper motor speed is determined by the frequency.

In another aspect of the first embodiment of the conveyor oven of the present disclosure, the controller controls the switch based on a temperature of the heater.

A first embodiment of a method of the present disclosure operates a conveyorized cooking oven by placing food products on a conveyor belt, providing heat to cook the food products, and driving the conveyor belt with a stepper motor.

In one aspect of the first embodiment of the method of the present disclosure, the method comprises further providing first and second out of phase sinusoidal currents to first and second windings, respectively of the stepper motor.

In another aspect of the first embodiment of the method of the present disclosure, the method further comprises controlling a speed of the motor based on a load variance of the food products on the conveyor belt.

In another aspect of the first embodiment of the method of the present disclosure, the heating step uses a heater and the method further comprises determining the load variance by monitoring a power consumption of the heater and controlling the stepper motor speed based on the power consumption, thereby controlling the conveyor belt speed.

In another aspect of the first embodiment of the method of the present disclosure, the power consumption is determined by an amount of time the heater is connected with an energy source.

In another aspect of the first embodiment of the method of the present disclosure, the stepper motor speed is further controlled based on a member of the group consisting of: a predetermined cook speed, the stepper motor speed and a combination thereof.

In a second embodiment of the conveyor oven of the present disclosure, a conveyor belt that is driven by a drive wheel. A heater is disposed to cook food products on the conveyor belt. A motor is coupled to the drive wheel. A controller is coupled to monitor a power consumption of the heater and to control a speed of the motor based on the power consumption, thereby controlling a speed of the conveyor belt.

In one aspect of the second embodiment of the conveyor oven of the present disclosure, the heater is an electric heater connected in circuit with a power main by a switch. The controller determines the power consumption based on an amount of time the heater is connected with the power main by the switch.

In another aspect of the second embodiment of the conveyor oven of the present disclosure, the controller further controls the motor speed based on a member of the group consisting of: a predetermined cook speed, the motor speed and a combination thereof.

In a second embodiment of the method of the present disclosure, the conveyor oven is operated by placing food products on a conveyor belt, operating a heater to cook the food products, driving the conveyor belt with a motor, monitoring a power consumption of the heater, and controlling a speed of the motor based on the power consumption.

In one aspect of the second embodiment of the method of the present disclosure, the power consumption is determined by an amount of time the heater is connected with an energy source.

In a third embodiment of the conveyor oven of the present disclosure, the oven comprises a conveyor belt and a heater that is disposed to cook food products on the conveyor belt. A controller is coupled to monitor a power consumption of the heater and to control a temperature of the heater based on the power consumption.

In one aspect of the third embodiment of the conveyor oven of the present disclosure, a switch connects and disconnects the heater with a power main. The controller monitors the power consumption by counting an on time of the switch, and controls the switch with a deviation of the power consumption based on a predetermined power consumption with the conveyor belt unloaded.

In another aspect of the third embodiment of the conveyor oven of the present disclosure, a temperature probe provides a signal indicative of a temperature of the heater. The controller uses the signal to control the switch to maintain the heater temperature in equilibrium with a set temperature despite variations of the heater temperature.

In another aspect of the third embodiment of the conveyor oven of the present disclosure, the temperature probe is disposed in contact with the heater.

In a third embodiment of the method of the present disclosure, the conveyor oven is operated by placing food products on a conveyor belt, operating a heater to cook the food products, monitoring a power consumption of the heater, and controlling a temperature of the heater based on the power consumption.

In one aspect of the third embodiment of the method of the present disclosure, the power consumption is monitored by counting an on time of a switch that connects and disconnects the heater with a power main. The temperature is controlled by using a deviation of the power consumption based on a predetermined power consumption with the conveyor belt unloaded to control the switch.

In another aspect of the third embodiment of the method of the present disclosure, the method further measures the temperature of the heater. The switch is controlled to maintain the heater temperature in equilibrium with a set temperature despite variations of the heater temperature.

BRIEF DESCRIPTION OF THE DRAWINGS

Other and further objects, advantages and features of the present disclosure will be understood by reference to the following specification in conjunction with the accompanying drawings, in which like reference characters denote like elements of structure and.

DESCRIPTION OF THE PREFERRED EMBODIMENT

Figure 1:
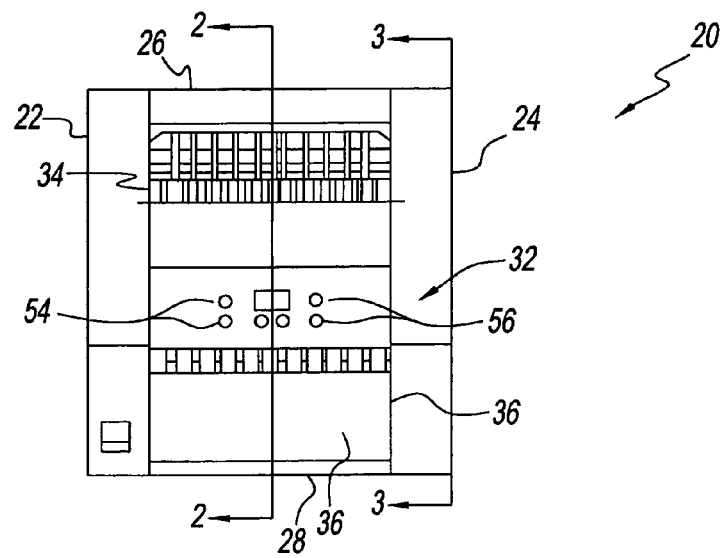
FIG. 1 is a front view of an oven of the present disclosure.
Figure 2:
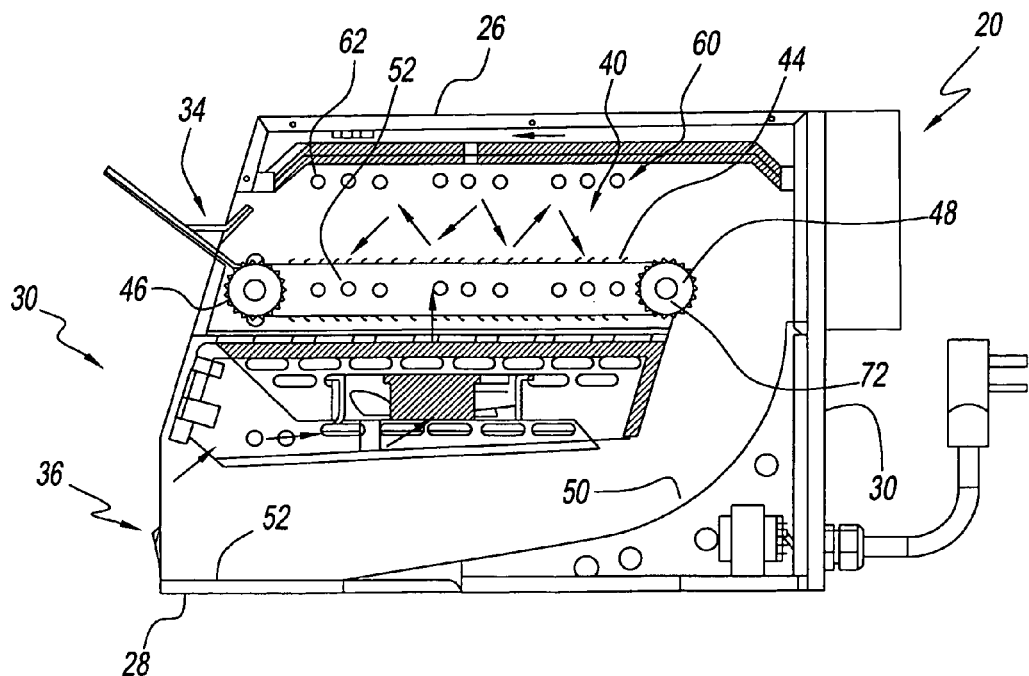
FIG. 2 is a cross-sectional view along line 2 of FIG. 1.
Figure 3:
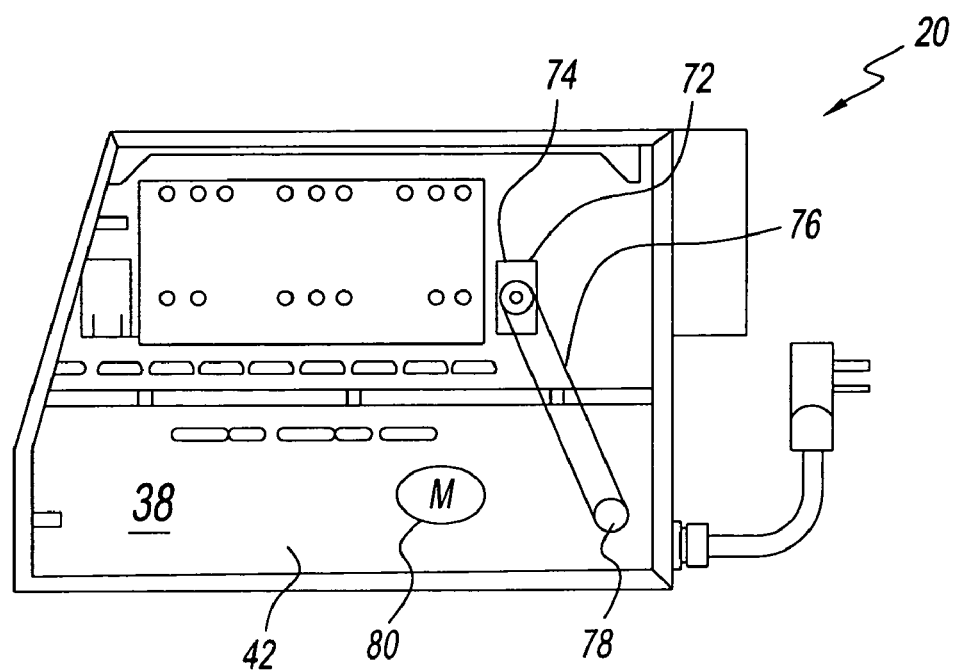
FIG. 3 is a cross-sectional view along line 3 of FIG. 1.

Referring to FIGS. 1-3, an exemplary oven 20 of the present disclosure comprises side walls 22 and 24, a top wall 26, a bottom wall 28, a back wall 30 and a front wall 32. Front wall 32 comprises a food entry port 34 and a food exit slot 36 near bottom wall 28. Food items to be toasted or cooked are inserted via food entry port 34 and after cooking are retrieved from food exit port 36. A partition 38 (shown in FIGS. 1 and 3) divides oven 20 into an oven compartment 40 (shown in FIG. 2) and a control compartment 42 (shown in FIG. 3).

A conveyor belt 44 is disposed in oven compartment 40 and is supported by a framework (not shown) that is attached, for example, to bottom wall 28. Conveyor belt 44 is disposed on an idler wheel 46 and a drive wheel 48 for clockwise rotation. One end of conveyor belt 44 is disposed near food entry port 34 so that upon entry food items land on conveyor belt 44 and are conveyed through oven compartment 40. At the opposite end of conveyor belt 44 the cooked food items fall by gravity onto a chute 50 that guides them to a tray 52 located adjacent food exit port 36.

A plurality of radiant heater elements 60 is disposed in oven compartment 40 above and below conveyor belt 44 to provide radiant heat toward the tops and bottoms of food items on conveyor belt 44. Manually operable cook temperature set buttons 54 and manually operable conveyor belt speed set buttons 56 are located on front wall 37.

Referring to FIGS. 2 and 3, drive wheel 48 comprises an axle 72 that extends through partition 38 into control compartment 42. Axle 72 is coupled via a pulley 74 and a belt 76 to a drive pulley drive pulley 78. Drive pulley 78 is driven by a motor 80, which is also disposed in control compartment 42.

Figure 5:
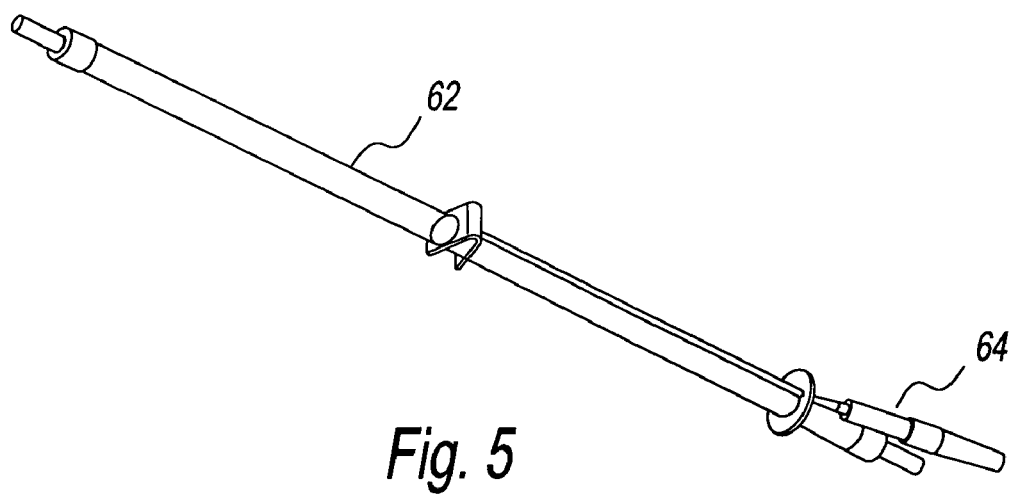
FIG. 5 is a view of a heater element and temperature probe of the oven of FIG. 1.
Figure 4:
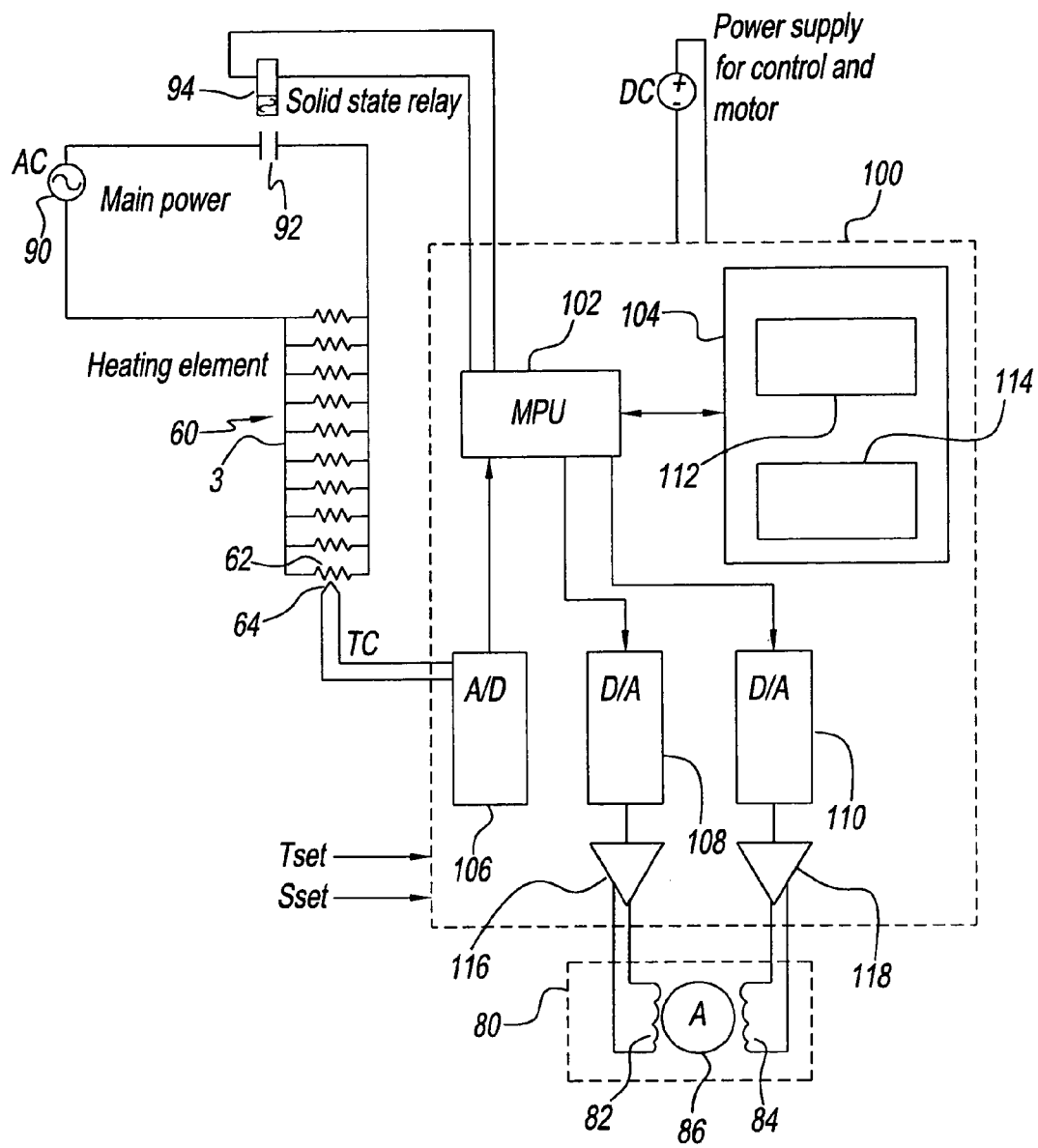
FIG. 4 is a schematic diagram of the oven of FIG. 1.

Referring to FIG. 4, oven 20 further comprises a controller 100 that controls radiant heating elements 60 to provide a consistent temperature in oven compartment 40 despite variations due to food item loading, power main variations and cooling due to heat loss to ambient via food entry port 34. A temperature probe 64 is embedded in heater elements 60, preferably in association with upper radiant heater element 62 (also shown in FIGS. 2 and 5) that is located near food entry port 34. Temperature probe 64, for example, may be a resistor temperature detector (RTD). In an alternate embodiment, temperature probe 64 may comprise a combination of a thermocouple and an ambient temperature probe.

Controller 100 also receives a set point temperature Tset based on a setting of cook temperature buttons 54 and a conveyor belt speed set point Sset based on a setting of conveyor speed buttons 56.

Radiant heating elements 60 are connected in circuit with an ac source 90 and contacts 92 of a relay 94. Relay 94 may be a solid state relay, such as a triac. Controller 100 processes signals received from temperature probes 64 and 66 and modulates relay 94 to maintain a nearly constant radiation from radiant heating elements 60.

Controller 100 comprises a microprocessor 102, a memory 104, an analog to digital (A/D) converter 106 and digital to analog converters 108 and 110. A heater program 112 and a motor program 114 are stored in memory 104. A/D converter 106 converts an analog signal from temperature probe 64 to digital values that are input to microprocessor 102.

Although motor 80 can be any suitable type, motor 80 is preferably a sine wave driven stepper motor that has first and second windings 82 and 84 and an armature 86. Armature 86 is coupled to drive pulley 78 (FIG. 3) so as to provide drive to drive wheel 48 via belt 76 to drive conveyor belt 44. This avoids the troublesome gear box required by other types of motors.

Microprocessor 102 executes heater program 112 to process the signal TC with a set temperature Tset to modulate relay 94 to control radiant heating elements 60 to provide a nearly constant radiation from the heating elements. The set point temperature is entered by a user or a cook program. Heater program 112 causes microprocessor 102 to compare or algebraically subtract TC with Tset to produce a difference value or signal that controls the switching on and off of relay 94. Heater program 112 evaluates temperatures Tset and TC at a predetermined rate, e.g., 40 times per second. The reaction time between applied power and measured temperature increase is somewhat slower than desired. To improve the temperature regulation some random noise is added to the measured heater temperature TC before comparison with the set point temperature Tset.

Due to noise from the ac source 90, a passive filter (not shown) can be used at the output of temperature probe 64 and a notch filter can be implemented in software and used by heater program 112 as well.

As food product is placed into oven 20, controller 100 increases the power level to heating elements 60 to maintain the temperature Tset from cook temperature set buttons 54. In an alternate embodiment, the power consumption of heater elements 60 is used to compensate for the load factor instead of or in combination with changing the belt speed. In this embodiment, heater program 112 includes instructions, which are executed by microprocessor 102 to monitor the power consumption and to use the monitored power consumption to adjust the value of Tset. The power consumption is monitored by counting the power cycles of on-time versus off-time of relay 94. This procedure is performed to calibrate the predetermined base power consumption level without a load (food items) on conveyor belt 44. This calibration may be performed, e.g., at the place of manufacture and stored in EPROM (not shown). In a cooking mode, heater program 112 causes microprocessor 102 to again perform the above procedure. Heater program 112 causes microprocessor 102 to compare the measured power consumption level with the predetermined base of the two dimensional Tset vs. power consumption level, to determine a deviation in power consumption. This deviation is used to change the value of Tset to achieve a more consistent heat treatment of the food products as the loading factor varies, i.e., continuous loading vs. single pieces.

Starting with an unloaded conveyor belt 44, TC and Tset are substantially the same and relay 94 is operated to control its on time and off time to maintain this equilibrium or state. When food product is loaded on to conveyor belt 44, TC begins to fall resulting in a negative delta (difference) between Tset and TC. Microprocessor 102 uses the negative delta to increase the on time of relay 94, thereby resulting in an increase in power consumption and, therefore, a deviation value as described above. Microprocessor 102 uses the power consumption deviation value to increase the value of Tset, thereby increasing the negative temperature delta, which in turn increases the on time of relay 94. With heaters 60 having more on time, TC begins to rise. This reduces the value of the negative delta, which is used to reduce the value of Tset and eventually bring TC and Tset back into equilibrium at the correlating Tset temperature.

In some embodiments it is not sufficient to maintain the temperature of the heating elements for a consistent browning of the food products between single and continuous runs. Accordingly, controller 100 also adjusts the speed of conveyor belt 44 in order to maintain uniform or consistent cooking of the food items. Controller 100 monitors power consumed by radiant heater elements 60 and, based on a predetermined or calibrated power consumption without loading, adjusts the conveyor belt speed accordingly.

Controller 100 measures the power consumption of heating elements 60 by counting power cycles of on-time versus off-time of relay 94 for a series of predetermined time periods or windows, e.g., each window being about two seconds. In an alternative embodiment, the count of power cycles is compensated by the deviation of actual mains voltage compared to nominal mains voltage. Controller 100 compares the current power consumption level with a pre-known (predetermined) power consumption level that corresponds with the base power consumption without any load. The difference of power consumption levels is used to calculate a corresponding change of speed of conveyor belt 44, where an increase of power consumption slows down conveyor belt 44 and prolongs the cooking time. However, the cooking time will not be as long as with the aforementioned common approach that increases the power level and maintains the radiating energy from the heating elements to the load.

Microprocessor 102 executes motor program 114 to provide the motor control. Motor program 114 includes a sine wave routine that is used by microprocessor 102 to generate two sine waves that are 90 degrees out of phase with one another. Motor program 114 causes microprocessor 102 to count the power cycles of on-time versus off-time of relay 94. This procedure is performed to calibrate the predetermined base power consumption level without a load (food items) on conveyor belt 44. This calibration may be performed, e.g., at the place of manufacture and stored in EPROM (not shown). In a cooking mode, motor program 114 causes microprocessor 102 to again perform the above procedure. Motor program 114 causes microprocessor to compare the measured power consumption level with the predetermined base power consumption level to determine a deviation in power consumption. The deviation is translated to a conveyor belt speed value and added algebraically to the speed set point Sset to provide a deviation speed value. The speed deviation value is used by microprocessor 102 to modify the frequency of the two sine waves by microprocessor 102. The frequency modified sine waves are fed to two digital to analog (D/A) converters 108 and 110 that convert the digital sine waves into analog sine waves that are filtered by low pass filters (not shown) to condition the wave shapes by smoothing. The sine waves are then fed by two amplifiers 116 and 118 that are connected to windings 82 and 84, respectively, of motor 80. Motor control program 114 causes microprocessor 102 to repeat this process at a high rate, e.g., 10,000 times per second) to generate two sine-wave currents separated in phase by 90° in windings 82 and 84, the frequency of which varies with the power consumption of heater elements 60. In an alternate embodiment, the speed deviation value can be sent to the digital to analog converters to modify the frequency.

In an alternate embodiment, motor program 114 causes microprocessor 102 to algebraically sum the deviation speed value and the conveyor belt speed set point Sset and process the sum with an actual motor speed value to provide a feedback control. The actual motor speed value is determined by the frequency of the sine wave current that is fed to stepper motor 80.

The two 90° phase shifted sinusoidal currents are applied to bipolar windings 82 and 84 to eliminate vibration and noise of stepper motor 80. This configuration results in a near vibration free motor that has a very smooth movement. Another advantage of the present disclosure is that it provides controlled torque that allows drive wheel 48 to have sufficient torque to run conveyor belt 44 without destroying the belt or motor when the belt stops due to interference with some object.

The heating element with a heat sensor is the weakest link in the toaster in terms of life and so when the heating element fails, the control will send out an error message and will provide an fixed power level regulation so the toaster can sill be used (assuming that the other heating elements are still working). That fixed power level will change dependent of the heat setting of buttons 54.

The conveyorized oven of the present disclosure provides a unique multiple heater configuration that provides cavity cooking uniformity. The conveyorized oven of the present disclosure also provides a unique voltage identifier feature in which the controller identifies the incoming voltage and pulses the correct power to the heater elements. The conveyorized oven of the present disclosure provides a unique stepper motor and motor drive for driving the conveyor belt. The conveyorized oven of the present disclosure also provides a unique speed adjustment to compensation for power consumption variations of heater elements 60, i.e., conveyor belt 44 slows down or speeds up to create uniform toasting of the bread.

A preferred embodiment of the conveyorized oven of the present disclosure is a toaster that includes upper and lower infrared heating elements that are controlled independently, a digital display, stainless steel construction, capability of toasting up to 800 buns per hour, a 10" wide conveyor belt big on volume, small in space, can accommodate 2 buns, or toast slices, can also toast bagels, Cibatta rolls, English muffins and more, and comes complete with NEMA 6-30 cord & plug.

While we have shown and described several embodiments in accordance with our disclosure, it is to be clearly understood that the same may be susceptible to numerous changes apparent to one skilled in the art. Therefore, we do not wish to be limited to the details shown and described but intend to show all changes and modifications that come within the scope of the appended claims.

What is claimed is:

1. A conveyor oven comprising;
   a conveyor belt that is driven by a drive wheel;
   an oven compartment in which said conveyor belt is disposed;
   a heater that is disposed to provide heat to cook food products disposed on said conveyor belt in said oven compartment;
   a switch that connects said heater in circuit with a power main;
   a stepper motor comprising an output shaft that is coupled to said drive wheel; and
   a controller that is coupled to drive said stepper motor and that determines a power consumption of said heater based on an amount of time said heater is connected with said power main by said switch.

2. A conveyor oven comprising:
   a conveyor belt that is driven by a drive wheel;
   a stepper motor comprising an output shaft that is coupled to said drive wheel; and
   a controller coupled to drive said stepper motor, and wherein said stepper motor further comprises first and second windings, and wherein said controller provides first and second sinusoidal currents to said first and second windings, respectively.

3. The conveyor oven of claim 2, wherein said first sinusoidal current is 90 degrees out of phase with said second sinusoidal current.

4. The conveyor oven of claim 1, wherein said controller controls a speed of said stepper motor based on a load variance of food products disposed on said conveyor belt.

5. The conveyor oven of claim 4, further comprising:
   wherein said controller determines said load variance by monitoring said power consumption of said heater and controls said stepper motor speed based on said power consumption, thereby controlling said conveyor belt speed.

6. The conveyor oven of claim 1, wherein said controller further controls said stepper motor speed based on a member of the group consisting of: a predetermined cook speed, said stepper motor speed and a combination thereof.

7. The conveyor oven of claim 6, wherein said stepper motor further comprises first and second windings, and wherein said controller provides first and second sinusoidal currents to said first and second windings, respectively, and wherein said first and second sinusoidal currents have a frequency that is a function of said power consumption and said member of said group.

8. The conveyor oven of claim 7, wherein said stepper motor speed is determined by said frequency.

9. A conveyor oven comprising:
   a conveyor belt that is driven by a drive wheel;
   a stepper motor comprising an output shaft that is coupled to said drive wheel;
   a switch that connects a heater in circuit with a power main; and
   a controller coupled to drive said stepper motor; wherein said controller controls a speed of said stepper motor based on a load variance of food products disposed on said conveyor belt, wherein said controller determines said load variance by monitoring a power consumption of said heater and controls said stepper motor speed based on said power consumption, thereby controlling said conveyor belt speed, and wherein said controller controls said switch based on a temperature of said heater.

10. A method for operating a conveyorized cooking oven comprising:
   placing food products on a conveyor belt that is disposed in an oven compartment;
   providing heat with a heater to cook said food products in said oven compartment;
   driving said conveyor belt with a stepper motor; and
   monitoring a power consumption of said heater based on an amount of time said heater is connected with an energy source.

11. A method for operating a conveyorized cooking oven comprising:
- placing food products on a conveyor belt that is disposed in an oven compartment;
- providing heat to cook said food products in said oven compartment;
- driving said conveyor belt with a stepper motor; and
- providing first and second out of phase sinusoidal currents to first and second windings, respectively, of said stepper motor.

12. The method of claim 10, further comprising controlling a speed of said motor based on a load variance of said food products on said conveyor belt.

13. The method of claim 12, further comprising controlling said stepper motor speed based on said power consumption, thereby controlling said conveyor belt speed.

14. The method of claim 13, wherein said stepper motor speed is further controlled based on a member of the group consisting of: a predetermined cook speed, said stepper motor speed and a combination thereof.

15. A conveyor oven comprising;
- a conveyor belt that is driven by a drive wheel;
- an oven compartment in which said conveyor belt is disposed;
- a heater that is disposed to provide heat to cook food products on said conveyor belt in said oven compartment;
- a motor coupled to said drive wheel;
- a switch that connects said heater in circuit with a power main; and
- a controller that is coupled to monitor a power consumption of said heater and to control a speed of said motor based on said power consumption, thereby controlling a speed of said conveyor belt, wherein said heater is an electric heater connected in circuit with a power main by a switch, and wherein said controller determines said power consumption based on an amount of time said heater is connected with said power main by said switch.

16. The conveyor oven of claim 15, wherein said controller further controls said motor speed based on a member of the group consisting of: a predetermined cook speed, said motor speed and a combination thereof.

17. A method for operating a conveyorized cooking oven comprising:
- placing food products on a conveyor belt disposed in an oven compartment;
- operating a heater to cook said food products in said oven compartment;
- driving said conveyor belt with a motor;
- monitoring a power consumption of said heater; and
- controlling a speed of said motor based on said power consumption,
- wherein said power consumption is determined by an amount of time said heater is connected with an energy source.

18. A conveyor oven comprising;
- a conveyor belt;
- a heater that is disposed to cook food products on said conveyor belt; and
- a controller that is coupled to monitor a power consumption of said heater and to control a temperature of said heater based on said power consumption.

19. The conveyorized oven of claim 18, further comprising a switch that connects and disconnects said heater with a power main, wherein said controller monitors said power consumption by counting an on time of said switch, and controls said switch with a deviation of said power consumption based on a predetermined power consumption with the conveyor belt unloaded.

20. The conveyorized oven of claim 18, further comprising a switch that connects and disconnects said heater with a power main, and a temperature probe that provides a signal indicative of a temperature of said heater, wherein said controller uses said signal to control said switch to maintain said heater temperature in equilibrium with a set temperature despite variations of said heater temperature.

21. The conveyorized oven of claim 20, wherein said temperature probe is disposed in contact with said heater.

22. A method for operating a conveyorized cooking oven comprising:
- placing food products on a conveyor belt that is disposed in an oven compartment;
- operating a heater to cook said food products in said oven compartment;
- monitoring a power consumption of said heater; and
- controlling a temperature of said heater based on said power consumption.

23. The method of claim 22, wherein said power consumption is monitored by counting an on time of a switch that connects and disconnects said heater with a power main, wherein said temperature is controlled by using a deviation of said power consumption based on a predetermined power consumption with the conveyor belt unloaded to control said switch.

24. The method of claim 22, further comprising measuring said temperature of said heater, wherein said switch is controlled to maintain said heater temperature in equilibrium with a set temperature despite variations of said heater temperature.

25. The conveyorized oven of claim 18, wherein said controller uses said monitored power consumption to adjust a value of a set point temperature of said heater.

26. The conveyorized oven of claim 25, wherein said value is adjusted based on a deviation of said monitored power consumption from a predetermined base power consumption without a load.

27. The conveyorized oven of claim 18, wherein said controller automatically controls said temperature of said heater based on said monitored power consumption.

* * * * *